B. F. DEVENDORF.
MACHINE FOR REMOVING SURPLUS PLANTS.
APPLICATION FILED DEC. 14, 1914.
1,208,514.
Patented Dec. 12, 1916.
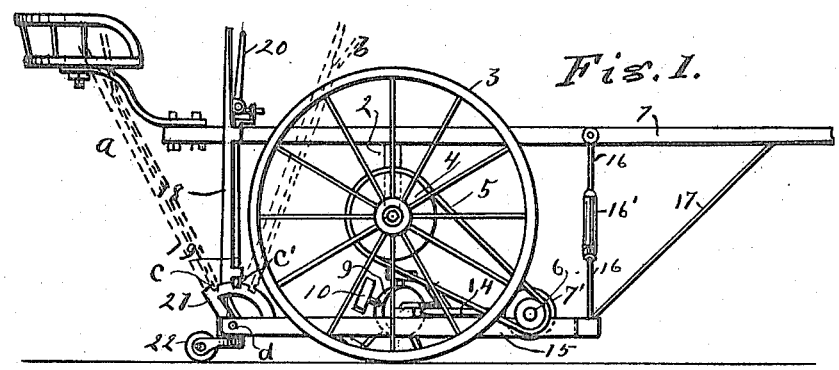
Fig. 1.
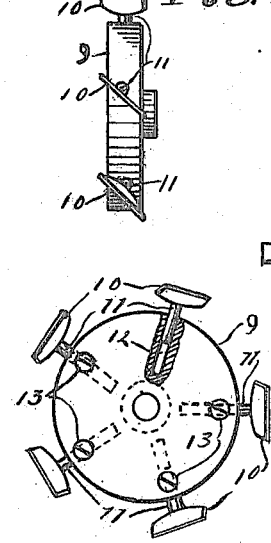
Fig. 4.
Fig. 5.
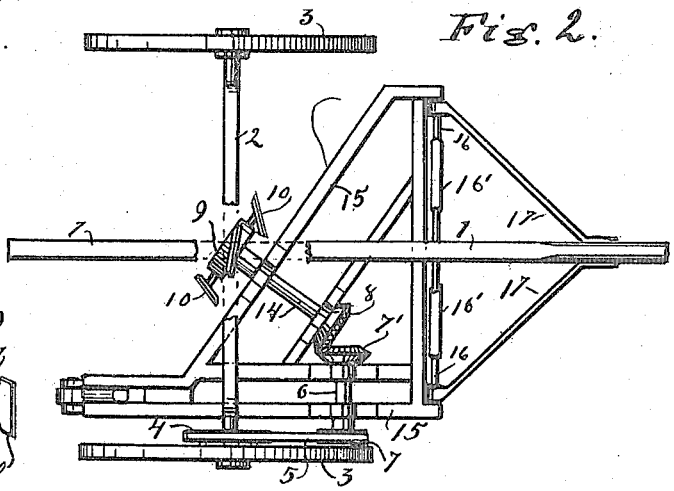
Fig. 2.
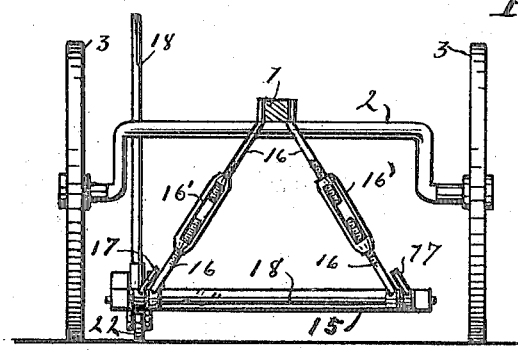
Fig. 3.
Witnesses
Chas. S. DeWitt
F. G. Friend
Inventor
Benjamin F. Devendorf
By Lehrich J. Cilley
Attorney

UNITED STATES PATENT OFFICE.

BENJAMIN F. DEVENDORF, OF GRANDVILLE, MICHIGAN.

MACHINE FOR REMOVING SURPLUS PLANTS.

1,208,514.     Specification of Letters Patent.     Patented Dec. 12, 1916.

Application filed December 14, 1914. Serial No. 877,607.

*To all whom it may concern:*

Be it known that I, BENJAMIN F. DEVENDORF, a citizen of the United States, residing at Grandville, in the county of Kent and State of Michigan, have invented certain new and useful Improvements in Machines for Removing Surplus Plants, of which the following is a specification.

My invention relates to improvements in appliances for thinning out the plants in over stocked rows of cotton plants, and its objects are:—First, to provide a means whereby the base upon which the cutting or thinning knives are carried may be raised and lowered to conform the positions of the knives to the form of the row being operated upon. Second, to provide a means whereby the position or angle of the cutting knives may be adjusted to meet the requirements of the rows being operated upon. Third, to so locate the knives that they will operate exactly upon the pivotal center of the machine frame when turning the machine around, or in case the team drawing the machine should vary their travel from a direct line with the row being operated upon. I attain these objects by the mechanism illustrated in the accompanying drawing, in which—

Figure 1 is a side elevation of a complete machine; Fig. 2 is a top plan of the same with a part of the axletree and of the tongue cut away to show the position of the cutters or knives; Fig. 3 is an end elevation of the machine with the cutters or knives removed, and designed to illustrate how the cutter bed may be raised and lowered to adjust the cutters to the condition of the surface of the ground; Fig. 4 is an edge elevation of the cutter head with the knives in place, and Fig. 5 is a side elevation of the same showing the manner of adjusting the position or angle of the cutter knives.

Similar figures and letters refer to similar parts throughout the several views in the drawing.

In the accompanying drawing 1 represents the tongue of the machine. 2 is the axletree and 3 3 are the wheels, the same as used in this class of machines.

4, 5 and 7 represent the driving wheel, the sprocket chain and the driven wheel respectively.

6 represents a driven shaft that is supported at right angles with the side rails of the knife supporting frame, 15, and 14 represents a shaft supported in the frame 15 at an angle of about 45 degrees with the side rails thereof, or with the shaft 6, and upon which the cutter head 9 is mounted. The head 9 in this machine must be located immediately under the longitudinal and lateral center of the axletree 2 so it will act as a pivotal center if the tongue is made to sway from side to side as the machine is being drawn along over a row of plants, by which means the knives will be made to cut the desired plants and in the proper manner so long as the axletree is centrally located over said row, no matter whether the tongue is being carried in direct alinement with the row or not, which could not possibly be done if the knives were carried backward, forward or to one side of the center of the axletree. A revoluble movement is transmitted from the shaft 6 to the shaft 14 through the medium of the bevel gears 7' and 8, so that the forward movement of the machine upon its wheels 3 3 will be directly transmitted to the cutter knives, as hereinafter stated. The object for placing the shaft 14 and the cutter head 9 at an angle of forty five degrees with the tongue and the axletree is to provide sufficient distance between the knives 10, as they are made to revolve over a row of plants, to safely allow a plant to pass between two knives so that the desired number of plants may be saved in each row as the surplus plants are being cut out, which would not be possible if the shaft 14 was parallel with the tongue and the cutter head 9 was parallel with the axletree, as the knives would then be in such position as to remove all of the plants.

Sometimes the rows of cotton plants are ridged upward with hollows between them in which the wheels of the machine travel, in which case the plants to be removed are considerably higher, relative to the rim of the wheel, than they would be if the plants were upon level ground, as often occurs, which renders it necessary to provide means for adjusting the position of the knives so the machine may be successfully used either upon fields with a perfectly level surface, or upon fields where the rows of cotton plants are considerably elevated above the normal surface of the ground, with corresponding valleys between the rows for the wheels to travel in. For this purpose the front end of the knife supporting frame 15 is suspended from the tongue 1 by means of longitudinally adjustable rods 16, the upper ends of which are secured to the tongue and the lower ends are pivotally connected with the rod 18 on the frame 15, or other available device on said frame, so that when the tongue 1 is raised upward in position to draw the machine, as indicated in Fig. 1, the front end of the frame 15 will be raised upward from the ground. To avert the danger of the frame 15 being drawn backward as the machine is being drawn forward over the ground, I place strong braces 17, secured at one end to the tongue 1 some distance ahead of the forward end of the frame 15, and at the other end to the said frame. This pivotal connection of the frame with the supporting rods 16 and the braces 17 leaves the back end of said frame normally free to drag upon the ground and without any other means of support or any means for adjusting the back end. To overcome this I place a lever 18 in position to be pivotally connected with the frame 15, as at $d$, and provide said lever with a supporting wheel 22 which is so arranged that by varying the position of the upper end of the lever forward and backward, the height of this end of the frame 15 may be varied, as, for instance, if the lever is thrown over to the position indicated by the dotted lines at $b$, with the latch 19 engaging the notch $c'$ in the rack 21, the end of the frame will be lowered below the position indicated by the solid lines in Fig. 1, and with the lever carried over to the position indicated by the dotted lines, $a$, with the latch 19 engaging the notch, $c$, the frame will be raised higher than the position shown by the solid lines hereinbefore referred to, so that by the proper manipulation of the lever 18 a considerable variation may be made in the height of this end of the frame from the ground to correspond with the height of the forward end of the frame from the ground. The latch 19 is operated with the lever 20 in the usual manner.

I provide for raising and lowering the front end of the frame 15 by means of turn buckles 16' in the divided rods 16 so arranged that the end of the frame may be raised or lowered thereby and held in the desired position. It will be readily understood that by this means the frame 15, and with it the cutter head 9 and the cutters 10 may be raised or lowered to correspond with the contour of the surface of the ground being worked over.

The knives 10 are arranged to be extended or withdrawn in the head 9, or to be turned to any desired angle with the periphery of the head by means of stems 11 passing into the head, as at 12, and secured in the desired positions by means of screws or bolts 13, substantially as indicated in Figs. 4 and 5.

The knife head 9 in this machine, is made to revolve practically three times as fast as the wheels 3 revolve, hence, with the position of the head practically at an angle of forty five degrees from the direction of the row, the knives cut shearingly through the row and at direct right angles therewith so that there is no possible danger of the knives being drawn edgewise against the plants and thus bending, marring or breaking them, which would be the case if the knife head stood at right angles with the row, or if it was located a considerable distance back, forward or to one side of the exact center of the axletree. Thus it will be seen that by placing the knife head directly under the center of the axletree I avert two very damaging results; first, a swinging movement of the knives as the tongue may be swayed sidewise, and a dragging movement as the knives are moving forward and cutting out plants.

What I claim as new, and desire to secure by Letters Patent of the United States, is:—

In combination with the two wheels, a single axletree, a tongue and a vertically adjustable shaft frame in a machine for cutting surplus plants from overstocked rows; a shaft mounted on the shaft frame in position to bisect the angle between one side of the tongue and one end of the axletree, means for revolving said shaft from one of the wheels, a cutter head on one end of said shaft immediately below the center of the axletree, knives adjustably mounted in the periphery of said head and arranged to be made to cut more or less of the plants in a row being operated upon without changing the natural rotary movement of the head.

Signed at Grand Rapids, Michigan, December 3rd, 1914.

BENJAMIN F. DEVENDORF.

In presence of—
L. E. KING,
I. J. CILLEY.

Copies of this patent may be obtained for five cents each, by addressing the "Commissioner of Patents, Washington, D. C."